（12） United States Patent
Apcar (10) Patent No.: US 9,734,676 B2
(45) Date of Patent: Aug. 15, 2017

(54) VISUAL INDICATION OF DATA CENTER CONDITIONS

(71) Applicant: Cisco Technology, Inc., San Jose, CA (US)

(72) Inventor: Jeff Apcar, Willoughby (AU)

(73) Assignee: Cisco Technology, Inc., San Jose, CA (US)

(*) Notice: Subject to any disclaimer, the term of this patent is extended or adjusted under 35 U.S.C. 154(b) by 4 days.

(21) Appl. No.: 14/658,761

(22) Filed: Mar. 16, 2015

(65) Prior Publication Data

US 2016/0275772 A1    Sep. 22, 2016

(51) Int. Cl.
| | |
|---|---|
| *G08B 19/00* | (2006.01) |
| *G08B 3/00* | (2006.01) |
| *G08B 21/00* | (2006.01) |
| *G08B 5/36* | (2006.01) |
| *G06F 11/32* | (2006.01) |
| *H05B 37/02* | (2006.01) |
| *G08B 21/18* | (2006.01) |

(52) U.S. Cl.
CPC .............. *G08B 5/36* (2013.01); *G06F 11/326* (2013.01); *G08B 21/18* (2013.01); *H05B 37/02* (2013.01)

(58) Field of Classification Search
CPC ............... G06Q 10/087; H05K 7/1498; H05K 7/20745; H05K 7/1492; H05K 7/20836; G08B 5/36; G08B 21/18; G06F 11/326; G06F 1/181; H05B 37/02
USPC .. 340/572.1, 8.1, 539.1, 521, 286.02, 691.1, 340/635, 815.45; 700/299, 300, 276, 700/277; 361/600, 724; 362/382, 249.02
See application file for complete search history.

(56) References Cited

U.S. PATENT DOCUMENTS

| | | | | |
|---|---|---|---|---|
| 2002/0190868 | A1* | 12/2002 | Dearborn ............... | G06F 11/326 340/691.1 |
| 2003/0197619 | A1* | 10/2003 | Lawrence .......... | H05K 7/20836 340/635 |
| 2005/0198243 | A1* | 9/2005 | Snible ................. | H04L 12/6418 709/223 |
| 2005/0286220 | A1* | 12/2005 | Moore ............... | H05K 7/20836 361/679.46 |
| 2009/0066486 | A1* | 3/2009 | Kiekbusch ............. | G08B 5/221 340/286.02 |
| 2009/0154159 | A1* | 6/2009 | Graybill .................... | F21K 9/00 362/249.02 |
| 2009/0261965 | A1* | 10/2009 | Cum ........................ | G08B 5/36 340/521 |

(Continued)

*Primary Examiner* — Hoi Lau
(74) *Attorney, Agent, or Firm* — Parker Ibrahim & Berg LLC; James M. Behmke; Stephen D. LeBarron (57) ABSTRACT

In one embodiment, an apparatus is disclosed that includes one or more device interfaces, a processor coupled to the one or more device interfaces and configured to execute a process, and a memory configured to store the process executable by the processor. The process when executed is operable to receive condition data regarding a measured condition of a zone of a data center. The process when executed is also operable to determine a visual effect for a portion of a light strip based on the condition data. The portion of the light strip is associated with the zone and is located in the zone. The process when executed is further operable to control the portion of the light strip to display the determined visual effect.

18 Claims, 5 Drawing Sheets

(56) References Cited

U.S. PATENT DOCUMENTS

| | | | | |
|---|---|---|---|---|
| 2011/0084839 A1* | 4/2011 | Groth | G06Q 10/087 | |
| | | | 340/572.1 | |
| 2011/0279261 A1* | 11/2011 | Gauger | F16P 3/14 | |
| | | | 340/539.1 | |
| 2011/0298607 A1* | 12/2011 | Priyantha | G06Q 10/087 | |
| | | | 340/505 | |
| 2012/0109404 A1* | 5/2012 | Pandey | H04L 67/12 | |
| | | | 700/299 | |
| 2012/0166693 A1* | 6/2012 | Weinstock | G06Q 10/087 | |
| | | | 710/105 | |
| 2013/0026220 A1* | 1/2013 | Whelihan | G06Q 10/087 | |
| | | | 235/375 | |
| 2014/0176947 A1* | 6/2014 | Hesketh | G06K 19/06037 | |
| | | | 356/402 | |
| 2014/0253289 A1* | 9/2014 | Groth | H05K 7/1498 | |
| | | | 340/8.1 | |
| 2014/0316583 A1* | 10/2014 | Ambriz | F24F 11/0012 | |
| | | | 700/277 | |
| 2015/0025690 A1* | 1/2015 | Abuelsaad | G05D 23/1934 | |
| | | | 700/276 | |
| 2015/0032283 A1* | 1/2015 | Kelkar | H05K 7/20745 | |
| | | | 700/300 | |
| 2016/0095247 A1* | 3/2016 | Rohr | H05K 7/1498 | |
| | | | 362/382 | |
| 2016/0133108 A1* | 5/2016 | Bucsa | G08B 17/11 | |
| | | | 340/629 | |

* cited by examiner

VISUAL INDICATION OF DATA CENTER CONDITIONS

TECHNICAL FIELD

The present disclosure relates generally to data centers, and, more particularly, to providing a visual indication of data center conditions.

BACKGROUND

As online services continue to grow in use, the data centers that support these services have also grown in terms size and complexity. Notably, some data centers now exceed over one million square feet in size and contain thousands of computing devices (e.g., servers, switches, routers, etc.). As the number of devices in a data center increase, so too does the amount of power consumed by the data center, the amount of heat generated by the devices, and other conditions associated with the data center.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an apparatus is disclosed that includes one or more device interfaces, a processor coupled to the one or more device interfaces and configured to execute a process, and a memory configured to store the process executable by the processor. The process when executed is operable to receive condition data regarding a measured condition of a zone of a data center. The process when executed is also operable to determine a visual effect for a portion of a light strip based on the condition data. The portion of the light strip is associated with the zone and is located in the zone. The process when executed is further operable to control the portion of the light strip to display the determined visual effect.

Description

Figure 1A:
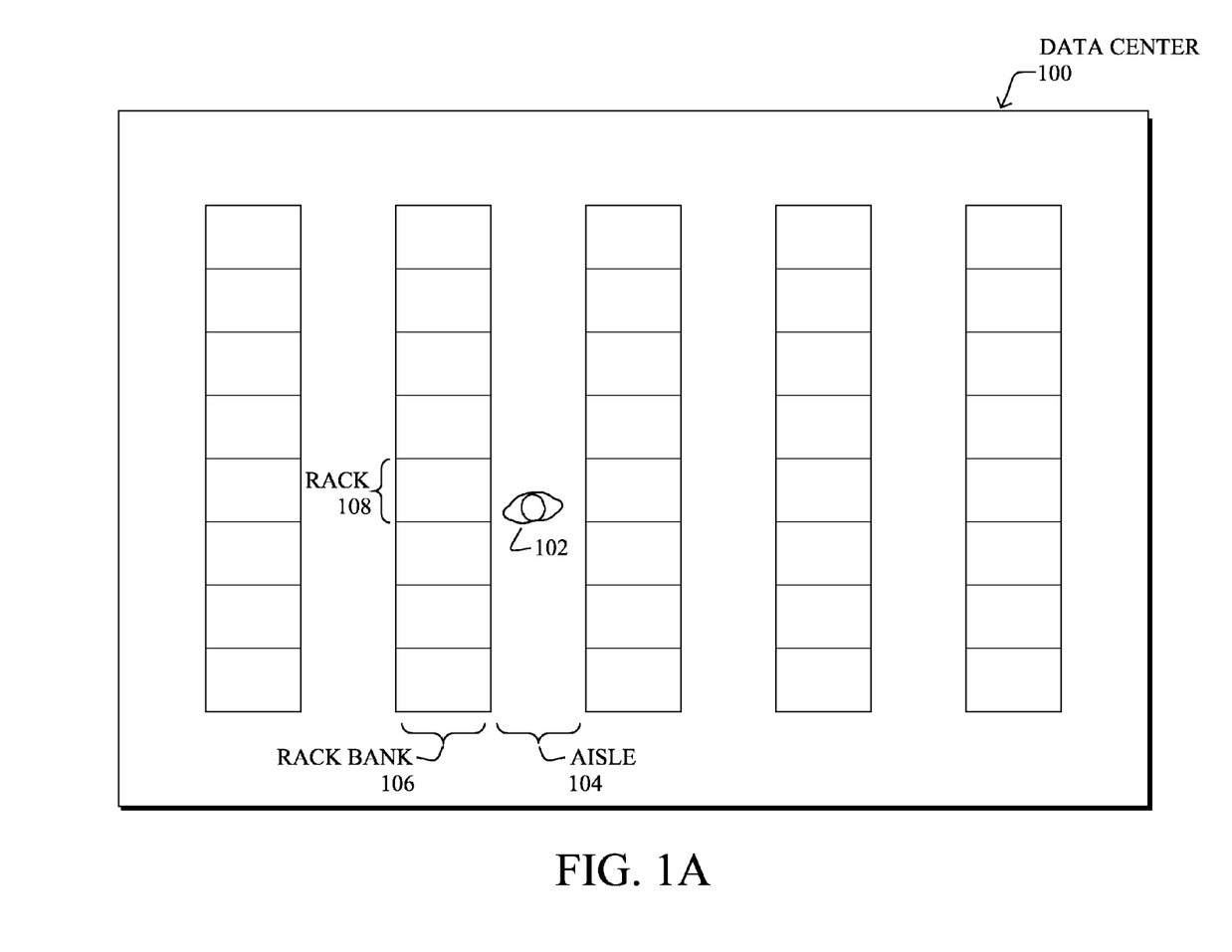
FIGS. 1A-1B illustrates an example data center.

FIG. 1A illustrates an example data center, according to various embodiments. As shown, data center 100 may house any number of racks 108 used to store various computing equipment. For example, a particular rack 108 may include one or more servers, routers, switches, backup power supplies, or other computing devices. The computing devices on a given rack 108 may be interconnected, e.g., via hardwired or wireless network connections (e.g., Cat5 cabling, Cat6 cabling, fiber, WiFi, etc.), inter-rack and/or intra-rack. Power may be supplied to the devices in each of racks 108 from a utility grid connected to data center 100 and/or from a local backup power source. For example, data center 100 may be equipped with a backup generator that continues to supply power to the computing devices housed in data center 100 in the event of a power outage.

As shown, racks 108 may be grouped within data center 100 to form any number of rack banks 106 separated by aisles 104. As would be appreciated, rack banks 106 may include any number of racks 108, the number of which may be varied based on the layout of data center 100, the number of computing devices housed in data center 100, or any other such factors.

Environmental conditions within data center 100 may be strictly controlled and monitored, according to various embodiments. For example, if data center 100 houses hundreds or even thousands of computing devices, this may generate a considerable amount of heat. Accordingly, data center 100 may include a heating, ventilation, and air conditioning (HVAC) system that monitors and controls the temperature, humidity, airflow, or other environmental conditions within data center 100.

In addition to monitoring the environmental conditions within data center 100, the operational states of the individual computing devices may also be monitored. Example device conditions that can be monitored may include, but are not limited to, the amount of free and/or used processing power of a device, the amount of free and/or used memory of the device, the number of connections made to the device, the amount of network traffic associated with the device (e.g., received traffic, sent traffic, etc.), the number of virtual machines (VMs) hosted by a device, network performance metrics associated with the device (e.g., queue size, packet loss, jitter, latency, etc.), the power consumption of the device, the type of device, the type of data processed by the device, the sensitivity/degree of classified data processed by the device, combinations thereof, or any other metric that may be used to quantify the operational status of a given device or rack 108.

In some cases, the environmental and/or device conditions within data center 100 may be collected and displayed on a centralized management console. Such a console may be located, for example, in a room adjacent to the room housing racks 108, at a remote location (e.g., to allow the remote monitoring of data center 100), or within the same room as that of racks 108. For example, an administrator may view one or more screens of the console that display the monitored environmental and/or device conditions within data center 100. In some cases, the monitored conditions may also be used by the console to generate alerts, such as when a monitored condition is outside of an expected range (e.g., the temperature is above a warning threshold, etc.).

While a centralized console may allow an administrator to review the status of the conditions within data center 100 remotely, this also requires that the administrator be located within close proximity to the management console. For example, consider the situation in which the administrator 102 decides to "walk the floor" of data center 100. In one implementation, alerts may be pushed by the centralized console to a mobile device associated with the administrator (e.g., a cellular phone, a tablet device, etc.), thereby allowing the administrator to monitor the conditions. However, this may require administrator 102 to purposely check his or her portable device periodically or at certain times, such as when a serious alert is triggered.

Figure 1B:
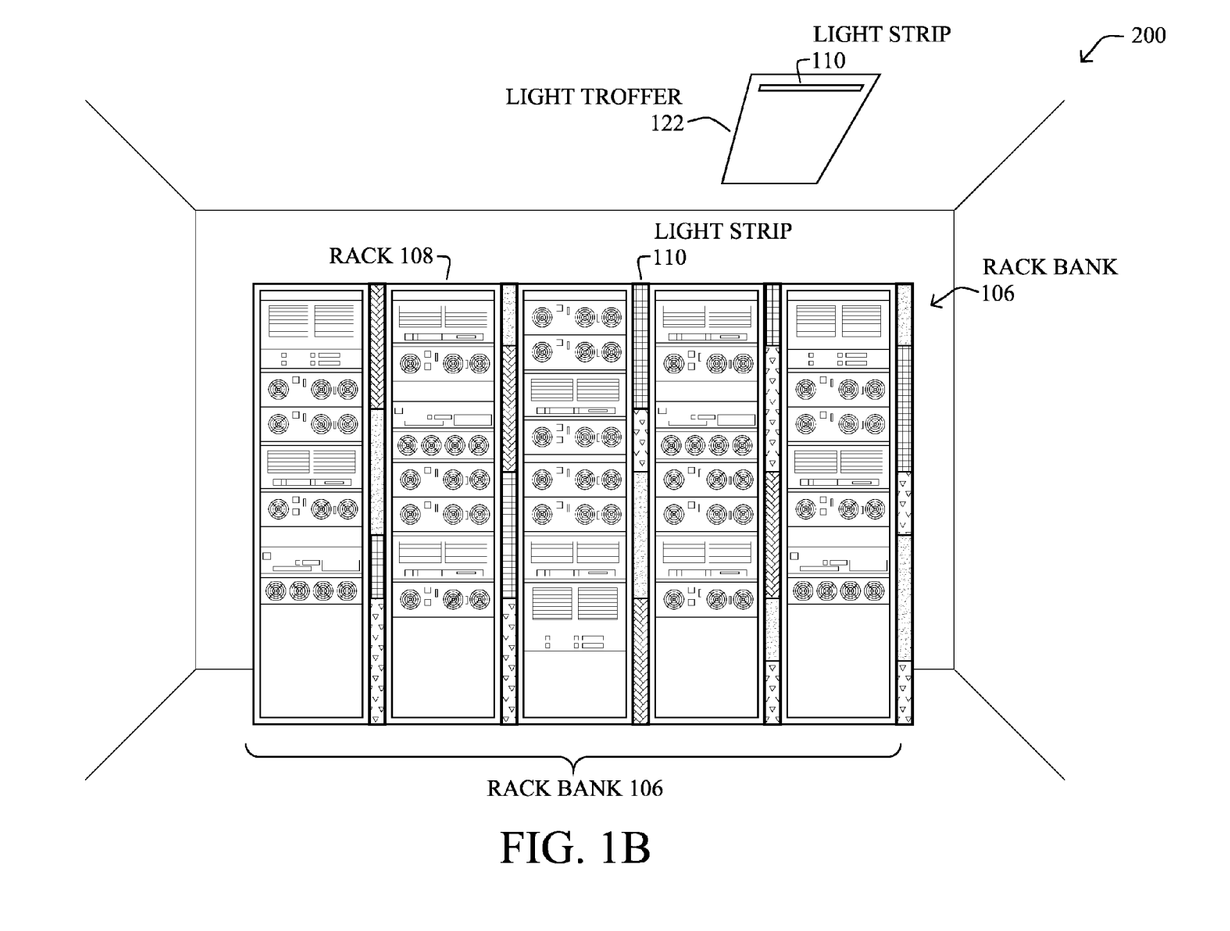

Referring now to FIG. 1B, data center 100 may be equipped with any number of light strips 110 that are operable to convey information regarding the conditions of data center 100 visually to a human within data center 100. In some embodiments, each of racks 108 in rack bank 106 may be equipped with a corresponding light strip 110, which may extend vertically and/or horizontally along the frames of racks 108. In general, a given light strip 110 may be controllable to illuminate with any number of different colors and/or intensities. For example, in one embodiment, each light strip 110 may include n-number of individually programmable light emitting diodes (LEDs) such as WS2812 LEDs. Notably, WS2812 LEDs are operable to produce red, green, and blue light and may be controlled to illuminate with any number of different colors by varying the amount of red, green, and blue produced by the LED.

In various embodiments, portions of a given light strip 110 (e.g., a set number of LEDs at set locations along the light strip and/or a given length of the light strip) may be associated with a particular measured condition and a particular zone within data center 100. For example, a light strip 110 associated with a given rack 108 may be subdivided into portions that align with individual devices located in the rack 108. A controller (e.g., controller 205 described below) may receive condition data regarding one or more conditions of the zone in which a portion of a light strip 110 is located (e.g., from a sensor, from a device located in the zone, etc.) and control the corresponding portion of the light strip 110 such that the measured condition is visually displayed in that portion of the light strip 110. For example, assume that the light strip 110 associated with a particular rack 108 is controlled to visually represent measured temperatures along the rack 108 (e.g., a first temperature range may be represented as green, a second temperature range may be represented as yellow, etc.). In such a case, a human within proximity of the light strip 110 may be able to quickly identify locations within data center 100 that are not within their expected temperature ranges. In another example, a user may be able to identify a problem with a specific device on a rack 108 based on the visual effects displayed by the corresponding portion of the light strip 110 associated with the rack.

In one embodiment, one or more light strips 110 may be mounted to ceiling 120 of data center 100. For example, a light strip 110 may be mounted to a light troffer 122 in a region of data center 100 that corresponds to a particular rack 108, rack bank 106, or other set of racks 108. Thus, even if an administrator or other interested human is not directly in front of the rack or set of racks, he or she may quickly identify locations in data center 100 that are exhibiting abnormal behavior and navigate to these locations. When combined with light strips 110 located along the front of racks 108, ceiling-mounted light strips 110 may provide a 3-dimensional (3-D) view of the conditions within data center 100 to a human. In further embodiments, light strips 110 may be coupled to the floor of data center 100 (not shown), in a manner similar to that described with respect to ceiling 120.

The visual indication provided by light strips 110 may allow a user to quickly survey what is going on in data center 100 at a glance, which may span many acres of floor space. In response to a problem (e.g., a zone in data center 100 that is illuminated red by light strips 110), the user may deploy a repair technician to the zone of concern (e.g., using a golf cart, bicycle, etc., to move around). For example, as shown in FIG. 1A, administrator 102 may be able to quickly identify any potential problems farther down aisle 104 simply by looking down aisle 104 and assessing the visual indicators displayed by the light strips 110.

Figure 2:
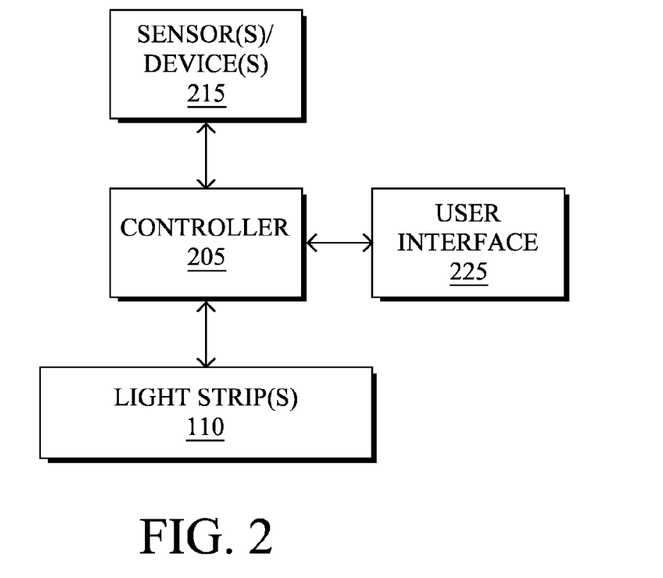
FIG. 2 illustrates an example system for providing a visual indication of the conditions of a data center.

FIG. 2 illustrates an example system 200 for providing a visual indication of the conditions of a data center, according to various embodiments. As shown, a controller 205 may be in electronic communication (e.g., via hardwired or wireless connections), with one or more sensors/devices 215, one or more light strips 110, and/or a user interface 225. During operation, sensor(s)/device(s) 215 may generate and provide condition data regarding a measured condition of a zone in the data center to controller 205. In some embodiments, the condition data may be provided by a given computing device located in one of racks 108 itself (e.g., regarding the device's condition). In other embodiments, the condition data may be provided by a sensor, such as a temperature sensor, humidity sensor, airflow sensor, etc., located within the corresponding zone of the data center.

In response to receiving condition data from sensor(s)/device(s) 215, controller 205 may determine a visual effect for a portion of one of light strip(s) that is associated with the condition data. For example, assume that the condition data corresponds to a measured temperature from the top of a given rack. In such a case, controller 205 may determine a color or other visual effect (e.g., blinking, light intensity, etc.) by comparing the measured condition to one or more ranges of values. Thus, if the temperature exceeds a given temperature threshold, controller 205 may determine that the associated color is red.

In addition to determining a visual effect based on the condition data, controller 205 may identify and control a portion of one or more light strips 110 that is associated with the zone from which the condition data was measured. In other words, controller 205 may control a portion of one or more of light strips 110 to display the visual effect associated with the measured condition. For example, assume that a temperature measurement was taken at the top of a given rack 108. In such a case, controller 205 may identify the corresponding portion(s) of light strip(s) 110 that are associated with the top of the particular rack 108 and control the portion(s) to be illuminated with the determined visual effect. For example, controller 205 may cause one or more LEDs of a light strip 110 along the top of the rack to be red, may cause one or more LEDs of a light strip 110 located along the ceiling above the rack to blink, etc.

In some embodiments, controller 205 may be in electronic communication with a user interface device 220 (e.g., a display, keyboard, etc.) that is configured to present data to a user and/or to convey input data from the user to controller 205. For example, controller 205 may receive data from user interface 225 that associates zones within a data center (e.g., data center 100) with portions of light strips 110, ranges of measured conditions with colors or other visual effects, etc. In some cases, user interface 225 may also control the operating mode of controller 205 such that controller 205 adjusts which condition is visually represented within the data center (e.g., by switching from indicating humidity to indicating temperature, etc.). In a further embodiment, controller 205 may control light strips 110 to act as work lights, such as by controlling light strips 110 in a particular zone, to provide white light to a technician working in the zone. In some cases, controller 205 user interface 225 may be part of a centralized visualization console operable to monitor the conditions of the data center.

Figure 3A:
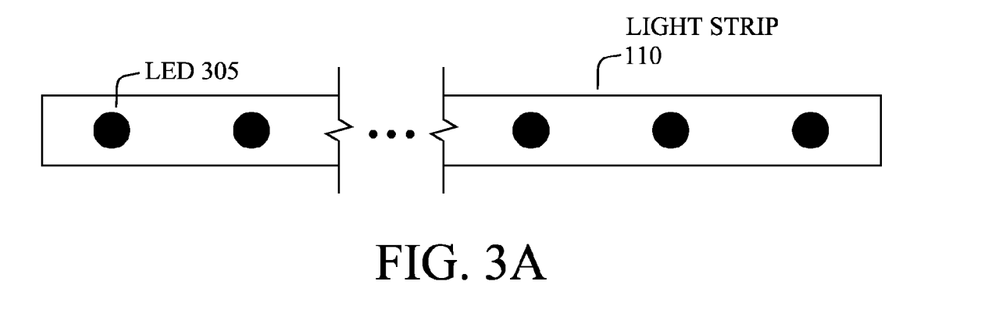
FIGS. 3A-3B illustrate an example light strip.
Figure 3B:
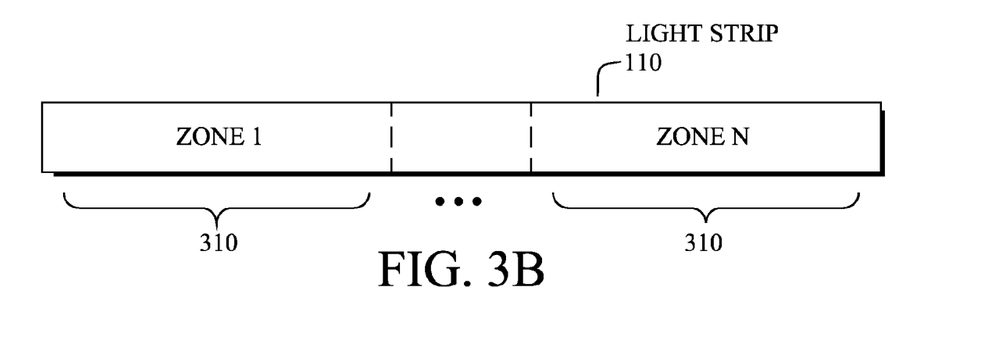

FIGS. 3A-3B illustrate an example light strip 110, according to various embodiments. As shown, a particular light strip 110 may include any number of light emitting diodes (LEDs) 305 that may be individually addressed and controlled, in some embodiments. For example, LEDs 305 may be WS2812 LEDs that may be individually controlled (e.g., one LED 305 on light strip 110 may be controlled to emit a one color at the same time that another LED 305 on the strip is controlled to emit a different color). In another embodiment, LEDs 305 may be addressed and controlled in groups (e.g., every five LEDs 305 may be controlled together, every ten LEDs 305 may be controlled together, etc.).

As shown in FIG. 3B, the LEDs 305 of light strip 110 may be grouped into any number of different groups/portions 310 and associated with any number of corresponding zones (e.g., a first through nth zone) in the data center. For example, assume that light strip 110 includes a total of one hundred and twenty LEDs 305. In such a case, light strip 110 may be subdivided into six portions 310 that each includes twenty LEDs 305. In another case, light strip 110 may be subdivided into four portions 310 that are associated with a first through fourth zone, with each of the portions 310 including thirty LEDs 305. In some cases, portions 310 may be separated by groups of one or more LEDs 305.

While the techniques herein generally provide for the use of light strips that contain LEDs, light strips that use other illumination mechanisms (e.g., incandescent bulbs, etc.) may also be used, according to the teachings herein. Further, the techniques herein may also be applied to other groups of LEDs or other illumination mechanisms such as signs, arrays, or the like.

Figure 4:
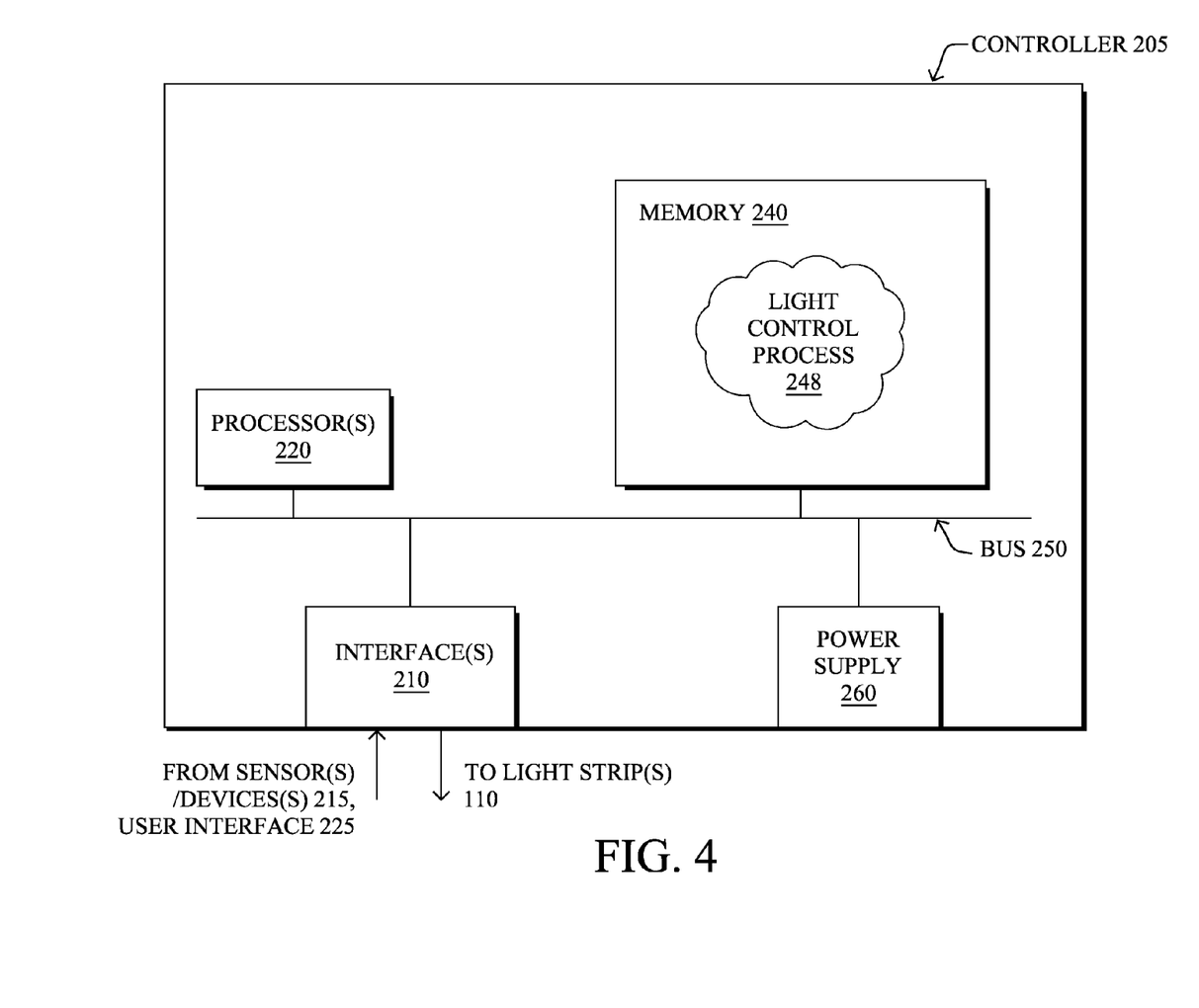
FIG. 4 illustrates an example light strip controller.

FIG. 4 illustrates an example controller 205 that may be used with one or more embodiments described herein. Controller 205 may comprise one or more interfaces 210 (e.g., network interfaces, peripheral interfaces, etc.), at least one processor 220, and a memory 240 interconnected by a system bus 250, and powered by a power supply 260 (e.g., battery, plug-in, etc.).

The interface(s) 210 include the mechanical, electrical, and signaling circuitry for communicating data between controller 205, one or more sensors/devices 215, a user interface device 225, and/or one or more light strips 110. For example, controller 205 may receive condition data from sensors/devices 215, receive operational parameters from user interface device 225, and/or provide control commands to light strips 110 based on the received condition data.

The memory 240 comprises a plurality of storage locations that are addressable by the processor 220 and the interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures of memory 240. Memory 240 may also store a light control process 248 that, when executed by processor(s) 220, cause controller 205 to perform the light control functions described herein.

In one embodiment, controller 205 may be a microcontroller (e.g., an Arduino controller, Raspberry Pi controller, Beagleboard controller, etc.) that is configured to activate groups of LEDs (e.g., LEDs 305 on light strips 110). In other words, controller 205 may control the corresponding portions of light strip(s) 110 that are associated with a particular zone in the data center and are located in or near the zone, to display the visual effect associated with one or more measured conditions of the zone. In some cases, the microcontroller and/or light strips 110 may have sensors integrated therein, or coupled to them, to measure the condition of the data center.

In some embodiments, controller 205 may be a centralized control device (e.g., a management console, etc.) that provides control over microcontrollers that are coupled to light strips 110 distributed throughout a data center. For example, controller 205 may be a fog computing device such as the IR910 Industrial Router by Cisco Systems, Inc., that controls microcontrollers coupled to light strips 110 (e.g., via LoRa™ wireless by Semtech, etc.). In another embodiment, controller 205 may be such a microcontroller itself (e.g., to provide localized control over one or more light strips 110). In other words, in some embodiments, controller 205 may be implemented as part of a distributed set of computing devices that operate to control light strips 110 within data center 100. In one embodiment, the distributed computing devices may use an application programming interface (API) implemented using the Representational State Transfer (REST) architectural style. For example, such an API may have the following format zone %=(value, color, transition, separator) that uses any or all of the following parameters:

%=zone number (e.g., the zone associated with the portion of the light strip to be controlled);
value=absolute value or % of LEDs to illuminate (e.g., 50% in a 4 zone strip of 120 LEDs would light up 15 LEDs in that zone/portion);
color=automatic, #RGB specific color, color name (e.g., green, yellow, etc.);
transition=appear, fade, ripple;
separator=how to visually split the zones (e.g., unlit LEDs, blinking LEDs, etc.).

Figure 5:
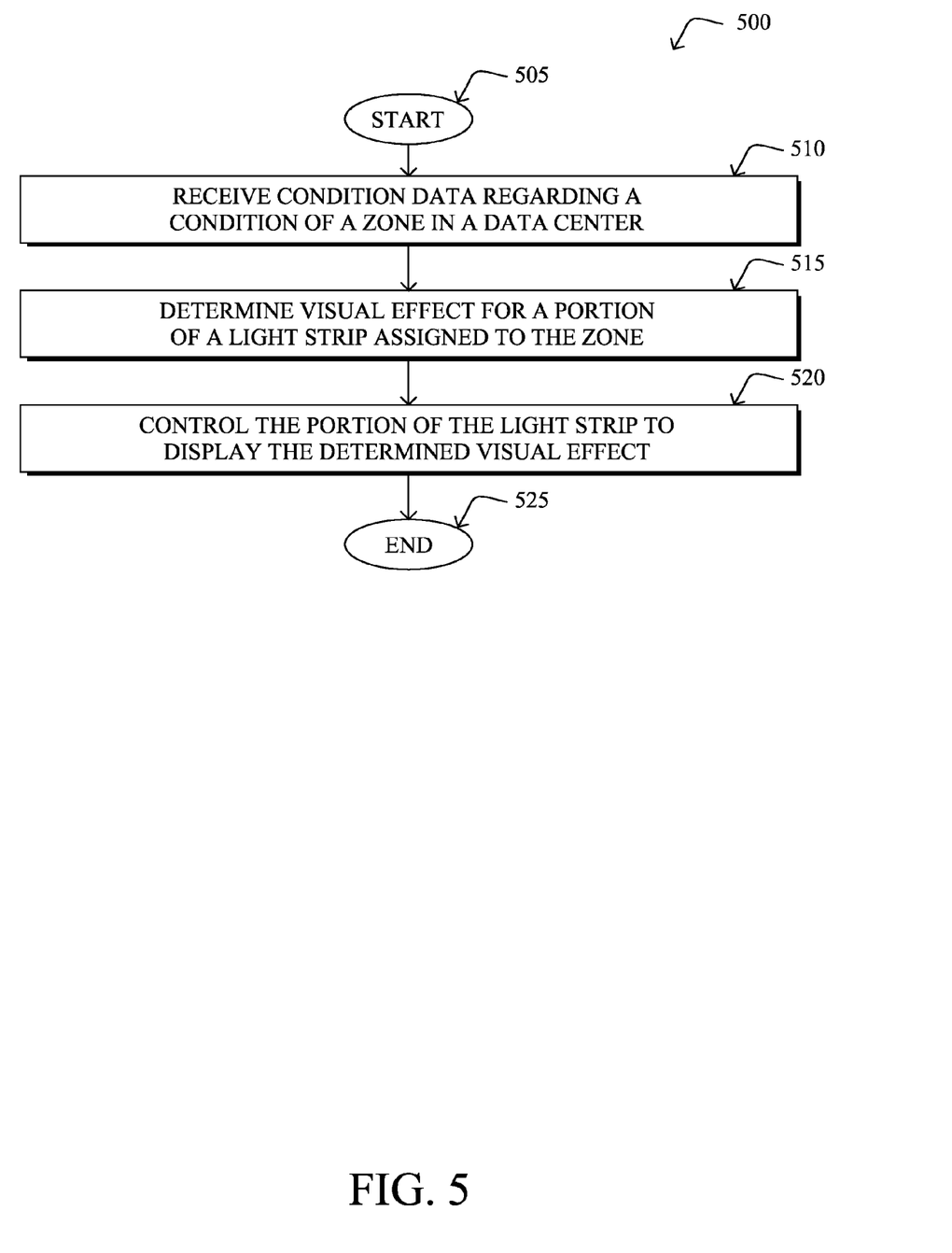
FIG. 5 illustrates an example simplified procedure for providing a visual indication of the conditions of a data center.

FIG. 5 illustrates an example simplified procedure for providing a visual indication of the conditions of a data center, according to various embodiments. Procedure 500 may be performed, in some implementations, by a controller for one or more light strips (e.g., controller 205 controlling light strip(s) 110). Procedure 500 begins at step 505 and continues on to step 510 where, as described in greater detail above, the controller receives condition data regarding a measured condition of a zone in a data center. In various embodiments, the controller may receive the condition data from a computing device located within the data center (e.g., located on a rack within the data center), a sensor external to such a computing device, or from an intermediary device that forwards the condition data to the controller. In general, the condition data may indicate the environmental state of the zone and/or the operational state of a computing device located within the zone. For example, the condition data may correspond to data that indicates the temperature of the zone, airflow in the zone, humidity in the zone, power consumption by a device in the zone, the types of data being processed by the device, the available and/or consumed resources of the device (e.g., processing power, memory, queue size, etc.), performance characteristics of the device (e.g., jitter, packet loss, etc.), combinations thereof, or any other information that may indicate the condition of the zone in the data center.

At step 515, as detailed above, the controller determines a visual effect for a portion of a light strip that is assigned to the zone based on the received condition data. Such a visual effect may be, for example, a determined color for the portion of the light strip (e.g., red, green, yellow, etc.), an illumination setting for the portion of the light strip (e.g., whether one or more LEDs in the portion of the light strip should be turned on or off, a light intensity, etc.), a blinking effect, or a percentage of the LEDs in the portion of the light strip that are to be illuminated.

In one embodiment, the light strip may be mounted to one or more racks within the data center and different portions of the light strip assigned to different zones (e.g., zones that correspond to different devices on the rack, etc.). In further embodiments, the portion of the light strip may be located on the ceiling or floor above or below the zone (e.g., above a particular rack or set of racks, etc.).

The determined visual effect may be mapped to a particular condition or set of measured conditions within the zone. For example, a measured condition may have one or more defined ranges values, with each range being mapped to a different color or other effect (e.g., if the measured temperature in the zone is within a first range, the portion of the light strip in the zone should be illuminated green, etc.). Similarly, a set of conditions (e.g., a set of ranges for measured values) may be mapped to a single color or other effect. For example, if the measured temperature and humidity in the zone are within expected ranges, the controller may determine that the portion of the light strip associated with the zone should be illuminated green.

In some embodiments, both the mapping between the portion of the light strip and the zone, as well as the measured condition(s) to colors or other visual effects for the corresponding portion of the light strip, may be received by the controller from a user interface device (e.g., a keypad, touch screen display, pointing device, etc.). For example, if the light strip includes a total of one hundred and twenty LEDs, a user may assign every 30 LEDs along the strip to different zones in the data center. Similarly, the user may specify when a particular portion of the light strip should display a particular visual effect (e.g., a color based on a measured temperature, etc.). In some embodiments, such as when multiple light strips are associated with the same zone (e.g., one light strip is mounted on a rack and another light strip is mounted to the ceiling above the rack, etc.), the controller may determine the visual effect to be displayed by each of the portions. Further, the controller may switch between operating modes based on input from the user interface device. For example, input from the user interface device may cause the controller to switch between different visual effects such as to visually display different conditions in the zone, to cause the portion of the light strip to be illuminated white (e.g., to provide more lighting to a technician working in the zone), etc.

At step 520, the controller controls the portion of the light strip associated with the zone to display the visual effect determined in step 515, as described in greater above. In one embodiment, the controller may provide a control command to each LED within the portion of the light strip (e.g., if each LED is individually addressable and controllable) or to the LEDs within the portion as a group. Such a control command may indicate the visual effect (e.g., a color, an illumination setting, etc.) and may be provided directly or indirectly to the light strip(s). For example, in one embodiment, the controller may provide a control command to a microcontroller that is coupled to the light strip and responsible for implementing the control command (e.g., by directly controlling the LEDs in the portion of the light strip). In another example, the controller may be directly coupled to the light strip and provide the control command to the corresponding LEDs of the light strip. Procedure 500 then ends at step 525.

The techniques described herein, therefore, provide spatial context to alarms and alerts in a data center through the use of programmable light strips located throughout the data center (e.g., on racks, light troffers, etc.). In some aspects, a distributed management reporting system is introduced herein that provides visual indications as to the health and status of the data center. Thus, a human operator walking through the lines of racks in the data center may visually inspect the condition of the data center.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
one or more device interfaces;
a processor coupled to the one or more device interfaces and configured to execute a process; and
a memory configured to store the process executable by the processor, the process when executed operable to:
receive condition data regarding measured conditions of a plurality of devices on a computer rack in a zone of a data center, wherein the zone is one of a plurality of zones in the data center;
determine a visual effect for a portion of a first light strip based on the condition data, wherein the first light strip is disposed along the plurality of devices in the zone and the portion of the first light strip is associated with and located along a device of the plurality of devices in the zone in which the data condition is measured, wherein each portion of the first light strip is aligned with each device of the plurality of devices respectively on the computing rack in the data center; and
control the portion of the first light strip to display the determined visual effect.

2. The apparatus as in claim 1, wherein the condition data is indicative of at least one of: a measured airflow in the zone, a measured temperature in the zone, or a measured humidity in the zone.

3. The apparatus as in claim 1, wherein the condition data is indicative of at least one of: an amount of available computing resources of the device of the plurality of devices located in the zone or an operational state of the device of the plurality of devices.

4. The apparatus as in claim 1, wherein the process when executed is further operable to:
associate the portion of the first light strip with the zone, in response to receiving a first instruction from a user interface device; and
map first light strip colors to ranges of the condition data, in response to receiving a second instruction from the user interface device, wherein the determined visual effect comprises one of the mapped first light strip colors.

5. The apparatus as in claim 1, wherein a second light strip is mounted to a ceiling of the data center above the computing rack.

6. The apparatus as in claim 1, wherein the apparatus is configured to control the first light strip by:

providing a control command to a microcontroller coupled to the first light strip, wherein the control command indicates the determined visual effect.

7. The apparatus as in claim 1, wherein a portion of a second light strip is also associated with the zone and located in the zone, and wherein the process when executed is operable to:
control the first and second light strips to illuminate the portions of the light strips located in the zone with the determined visual effect.

8. The apparatus as in claim 1, wherein the determined visual effect comprises one or more of: a determined color for the portion of the first light strip, an amount of illumination by the portion of the first light strip, a blinking effect, or a percentage of the LEDs in the portion of the first light strip that are to be illuminated.

9. A method comprising:
receiving, at a controller, condition data regarding measured conditions of a plurality of devices on a computer rack in a zone of a data center, wherein the zone is one of a plurality of zones in the data center;
determining, by the controller, a visual effect for a portion of a first light strip based on the condition data, wherein the first light strip is disposed along the plurality of devices in the zone and the portion of the first light strip is associated with and located along a device of the plurality of devices in the zone in which the data condition is measured, wherein each portion of the first light strip is aligned with each device of the plurality of devices respectively on the computing rack in the data center; and
controlling, by the controller, the portion of the light strip to display the determined visual effect.

10. The method as in claim 9, wherein the condition data is indicative of at least one of: a measured airflow in the zone, a measured temperature in the zone, or a measured humidity in the zone.

11. The method as in claim 9, wherein the condition data is indicative of at least one of: an amount of available computing resources of the device of the plurality of devices located in the zone or an operational state of the device of the plurality of devices.

12. The method as in claim 9, further comprising:
associating, by the controller, the portion of the first light strip with the zone, in response to receiving a first instruction from a user interface device; and
mapping, by the controller, first light strip colors to ranges of the condition data, in response to receiving a second instruction from the user interface device, wherein the determined visual effect comprises one of the mapped first light strip colors.

13. The method as in claim 9, wherein a second light strip is mounted to a ceiling of the data center above the computing rack.

14. The method as in claim 9, wherein the controller controls the portion of the first light strip to display the determined visual effect by:
providing, by the controller, a control command to a microcontroller coupled to the first light strip, wherein the control command indicates the determined visual effect.

15. The method as in claim 9, wherein a portion of a second light strip is also associated with the zone and located in the zone, and wherein the method further comprises:
controlling, by the controller, the first and second light strips to illuminate the portions of the light strips located in the zone with the determined visual effect.

16. The method as in claim 9, wherein the determined visual effect comprises one or more of: a determined color for the portion of the first light strip, an amount of illumination by the portion of the first light strip, a blinking effect, or a percentage of the LEDs in the portion of the first light strip that are to be illuminated.

17. A tangible, non-transitory, computer-readable media having software encoded thereon, the software when executed by a processor of a device operable to:
receive condition data regarding measured conditions of a plurality of devices on a computer rack in a zone of a data center, wherein the zone is one of a plurality of zones in the data center;
determine a visual effect for a portion of a first light strip based on the condition data, wherein the first light strip is disposed along the plurality of devices in the zone and the portion of the first light strip is associated with and located along a device of the plurality of devices in the zone in which the data condition is measured, wherein each portion of the first light strip is aligned with each device of the plurality of devices respectively on the computing rack in the data center; and
control the portion of the light strip to display the determined visual effect.

18. The computer-readable media of claim 17, wherein the software when executed is further operable to:
associate the portion of the first light strip with the zone, in response to receiving a first instruction from a user interface device; and
map first light strip colors to ranges of the condition data, in response to receiving a second instruction from the user interface device, wherein the determined visual effect comprises one of the mapped first light strip colors.

* * * * *